United States Patent
Won et al.

(10) Patent No.: US 6,330,148 B1
(45) Date of Patent: Dec. 11, 2001

(54) FLAT PANEL DISPLAY MODULE FOR COMPUTER

(75) Inventors: Se Chang Won; Dong Jae You, both of Kyongbuk (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/480,999

(22) Filed: Jan. 11, 2000

(30) Foreign Application Priority Data

Jan. 13, 1999 (KR) .................................. 99-1112
Oct. 27, 1999 (KR) ................................ 99-46947

(51) Int. Cl.[7] ........................................... G06F 1/16
(52) U.S. Cl. .................... 361/681; 361/683; 361/682; 349/58; 364/708.1
(58) Field of Search ..................... 361/680–685, 361/687, 688; 349/58–62, 70, 158, 16, 165; 248/917–919, 921–923; 345/905; 359/819, 811, 83; 364/708.1; 312/223.1, 223.2; 362/224–225, 237–241, 245, 260, 297, 346–348, 217, 29

(56) References Cited

U.S. PATENT DOCUMENTS

| | | |
|---|---|---|
| 5,216,411 | 6/1993 | Ashitomi et al. . |
| 5,422,751 * | 6/1995 | Lewis et al. ............................. 359/83 |
| 5,436,745 * | 7/1995 | Voisin et al. ............................ 359/88 |
| 5,504,605 * | 4/1996 | Sakuma et al. ......................... 359/83 |
| 5,640,216 * | 6/1997 | Hasegawa et al. ..................... 349/58 |
| 5,905,550 * | 5/1999 | Ohgami et al. ......................... 349/58 |
| 6,002,582 * | 12/1999 | Yeager et al. ......................... 361/681 |
| 6,064,565 * | 5/2000 | Ishihara et al. ....................... 361/681 |
| 6,128,183 * | 10/2000 | Uchiyama et al. ................... 361/681 |
| 6,212,067 * | 4/2001 | Nakajima et al. .................... 361/681 |
| 6,215,476 * | 4/2001 | Depew et al. ........................ 345/173 |

FOREIGN PATENT DOCUMENTS

| | | | |
|---|---|---|---|
| 2 319 110 A | 5/1998 | (GB) . | |
| 2 331 633 A | 5/1999 | (GB) . | |
| 2 336 708 A | 10/1999 | (GB) . | |
| 404051595-A * | 2/1992 | (JP) | ................................. H05K/5/02 |
| 411109875-A * | 4/1999 | (JP) | ................................... G09F/9/00 |

* cited by examiner

Primary Examiner—Leo P. Picard
Assistant Examiner—Michael Datskovsky
(74) Attorney, Agent, or Firm—Long Aldridge & Norman LLP

(57) ABSTRACT

Disclosed is a portable computer which includes a display panel having a front surface, a plurality of side surfaces and a bottom surface, the front surface including a display area; an upper supporting frame covering an edge or peripheral region of the display area of the display panel; a lower supporting frame supporting the bottom of the display panel and contacting the bottom surface; and a fastening unit having a main portion and a bent portion vertical to the main frame, the main portion secured to the lower supporting frame, the bent portion contacting the side surface, and having a screw hole. Using the fastening unit according to the invention, there are described advantages that the lower supporting frame is firmly supported and the side mounting method can be applied to a thin liquid crystal display device regardless of a thickness of the lower supporting frame.

21 Claims, 14 Drawing Sheets

FLAT PANEL DISPLAY MODULE FOR COMPUTER

This application claims the benefit of Korean Patent Application Nos. 1999-01112 and 1999-46947, filed on Jan. 13, 1999 and on Oct. 27, 1999, respectively, which are hereby incorporated by reference.

BACKGROUND OF THE INVENTION

1. Field of the Invention

The present invention relates generally to a flat panel display device, and more particularly, to a flat panel display device mounting structure on a computer.

2. Description of the Related Art

Flat panel display devices include liquid crystal display devices (LCD) which are used widely, plasma display panels, and field emission displays which have been studied recently and may be applied to computers in the near future.

For convenience of explanation, the present invention will be discussed with respect to the LCD as an example of a flat screen type display device and a portable computer with the LCD device mounted therein.

Referring to FIG. 1, a general portable computer such as a laptop or notebook computer typically includes a body 100, a flat panel display device assembly 120 coupled to the body 100 via a hinge mechanism 124. The flat panel display device assembly 130 has a flat panel display module 130 and a display case 105 supporting the module 130. The body 100 has an input device 110 such as a keyboard. As a flat panel display module 130, the LCD is widely used in portable computers and flat screen monitors.

Referring to FIG. 2 which shows a conventional assembly structure of the LCD device applied to a conventional portable computer, the display case 105 has a back case 124 and a front case or frame 122 for mounting the LCD module 130. The back case 124 has an outer surface and an inner surface and connecting ribs 124a formed at the corners.

The LCD module 130 has an LCD panel 132, a back light device 134 fixed to the back of the LCD panel 132, and a metal sash or supporting frame 136 for assembling the panel 132 and the back light device 134 along the edge. The back light device 134 is shown in the cutway portion of FIG. 2.

At the corners of the metal sash 136, corresponding to the positions of the ribs 124a of the back case 124, a plurality of protrusions 136a having holes are formed.

For mounting the LCD module 130 to the case 105, the LCD module 130 is placed on the back case 124 and the holes of the metal sash 136 and the ribs 124a are fastened together preferably by screws 138. The front case 122 is coupled to the back case 124.

Hereinafter, the method of assembling the LCD device wherein the LCD module is mounted to the case using fasteners extending from the front toward the rear direction is defined as the front mounting method, and the assembled structure of the LCD module and the case made through the front mounting method is defined as the front mounting structure.

In the front mounting structure described above, since the protrusions 136a require additional space corresponding to the protruded width "d", the ratio of the display area of the LCD module to the fixed size of the case 105 is reduced.

SUMMARY OF THE INVENTION

Accordingly, the present invention is directed to a flat panel display device module for computer that substantially obviates one or more of the problems due to the limitations and disadvantages of the related art, while retaining its advantage.

An object of this invention is to provide a portable computer with a liquid crystal display module assembled a side mounting method.

Another object of the invention is to provide a portable computer with a structure that can firmly support a printed circuit board (hereinafter referred to simply as "PCB") and a back light device in the side mounting method.

Additional features and advantages of the invention will be set forth in the description with follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and the in accordance with the purpose of the present invention, as embodied and broadly described, the present invention provides, in one embodiment, a computer comprising a display panel having a front surface, a plurality of side surfaces and a bottom surface, the front surface including a display area; an upper supporting frame covering an edge or peripheral region of the display area of the display panel; a lower supporting frame supporting the bottom of the display panel and contacting the bottom surface; and a fastening unit having a main portion and a first bent portion vertical to the main portion, the main portion secured to the lower supporting frame, the bent portion contacting the side surface, and having a screw hole.

In another embodiment, the present provides a computer comprising: a system body;

a flat panel display device module having a front surface, a bottom surface and a plurality of side surfaces; a supporting body being coupled to the body via a hinge mechanism and having a supporting surface parallel to the side surface of the module; and a fastening unit having a main portion and a first bent portion vertical to the main portion, the main portion being secured to the bottom of the module and the bent portion being secured to the supporting surface of the supporting body.

In further embodiment, the present provides a computer comprising a liquid crystal display panel having a front surface and a bottom surface; a back light device arranged on the bottom surface of a liquid crystal display panel; a first frame supporting the back light device; a second frame located on the front surface of the liquid crystal display panel and being coupled with the first frame; an outer case; and a fastening unit having a main portion and a first bent portion vertical to the main portion, the main portion being coupled with the first frame, the bent portion being coupled with the second frame and the outer case.

The bent portion of the fastening unit are located between the side surface of the display panel and the upper supporting frame. The fastening unit further comprises a second bent portion vertical to the main portion, the two bent portions of the fastening unit are opposite to each other, the main portion connecting the two bent portions. The computer further includes a drive circuit board, the drive circuit board being firmly contacted by the main portion of the fastening unit. The computer further includes a back light device having a light source disposed between the display panel and the lower supporting frame in a longitudinal direction, with the main portion of the fastening unit surrounding the light source. The main portion of the fastening unit is fastened to the lower supporting frame via a screw. The upper supporting frame has a side wall and a through hole corresponding to the screw hole of the bent portion of the fastening unit. The lower supporting frame has a recess portion corresponding to the screw hole of the bent portion of the fastening unit such that the fastening unit is attached to the lower supporting frame via a screw. The bent portions of the fastening unit has a plurality of outward extending flexible protrusion portion, and the upper supporting frame has a plurality of flexible recess portions corresponding to the protrusion portion of the fastening unit such that the upper supporting frame and the fastening unit being are coupled with the fastening unit if the upper supporting frame is pressed downwardly by a predetermined force.

It is to be understood that both the foregoing general description and the following detailed description are exemplary and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

Reference will now be made in detail to the preferred embodiments of the present invention, an example of which is illustrated in the accompanying drawings.

Methods for mounting the liquid crystal display module to the case in the side direction are disclosed in U.S. Pat. Nos. 5,835,139 and 5,872,606, which are assigned to the assignee of the present invention.

Figure 1:
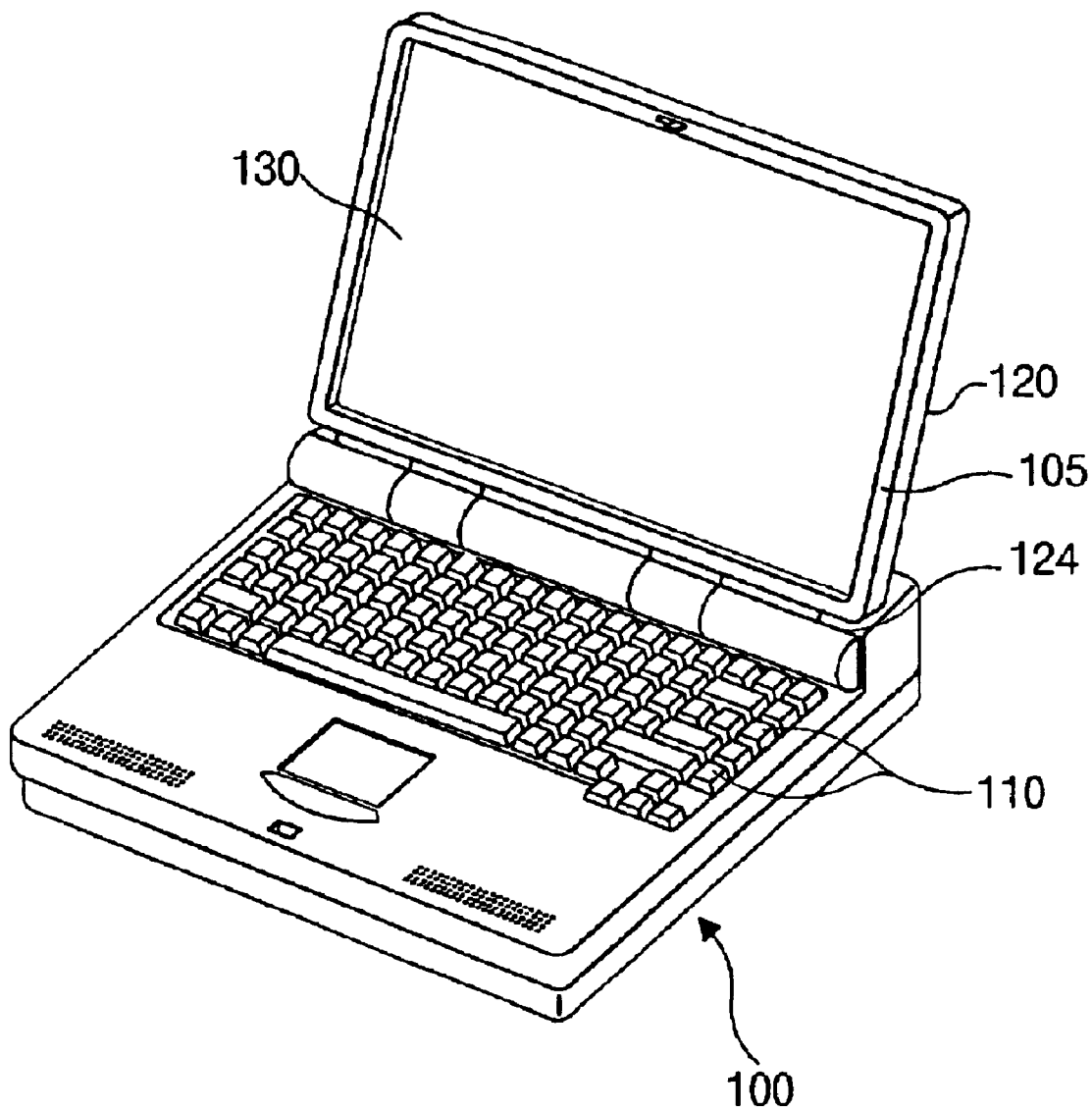
FIG. 1 is a perspective view showing a general portable computer.
Figure 2:
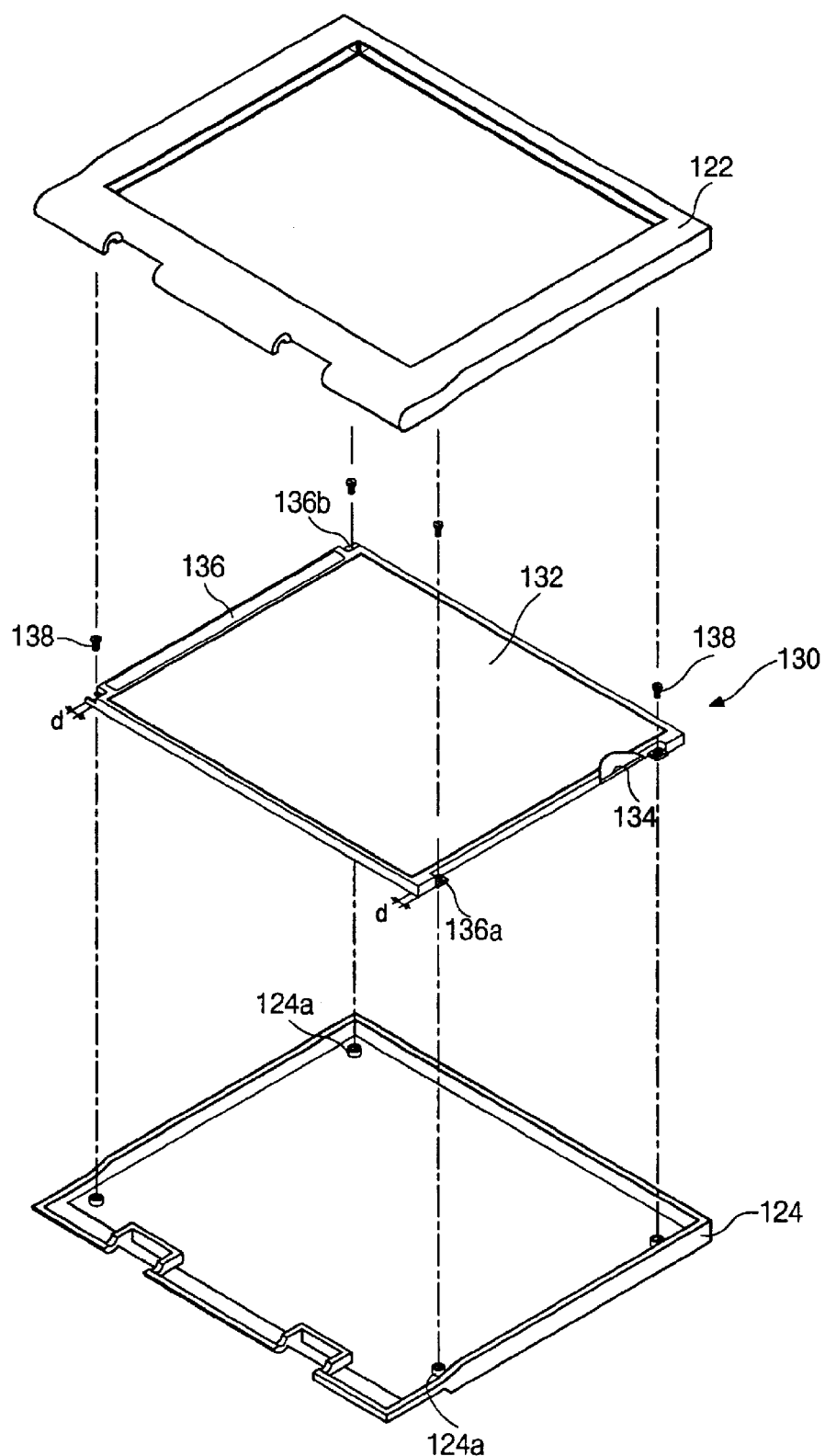
FIG. 2 is an exploded perspective view showing a conventional mounting structure of the LCD device for a portable computer.
Figure 3:
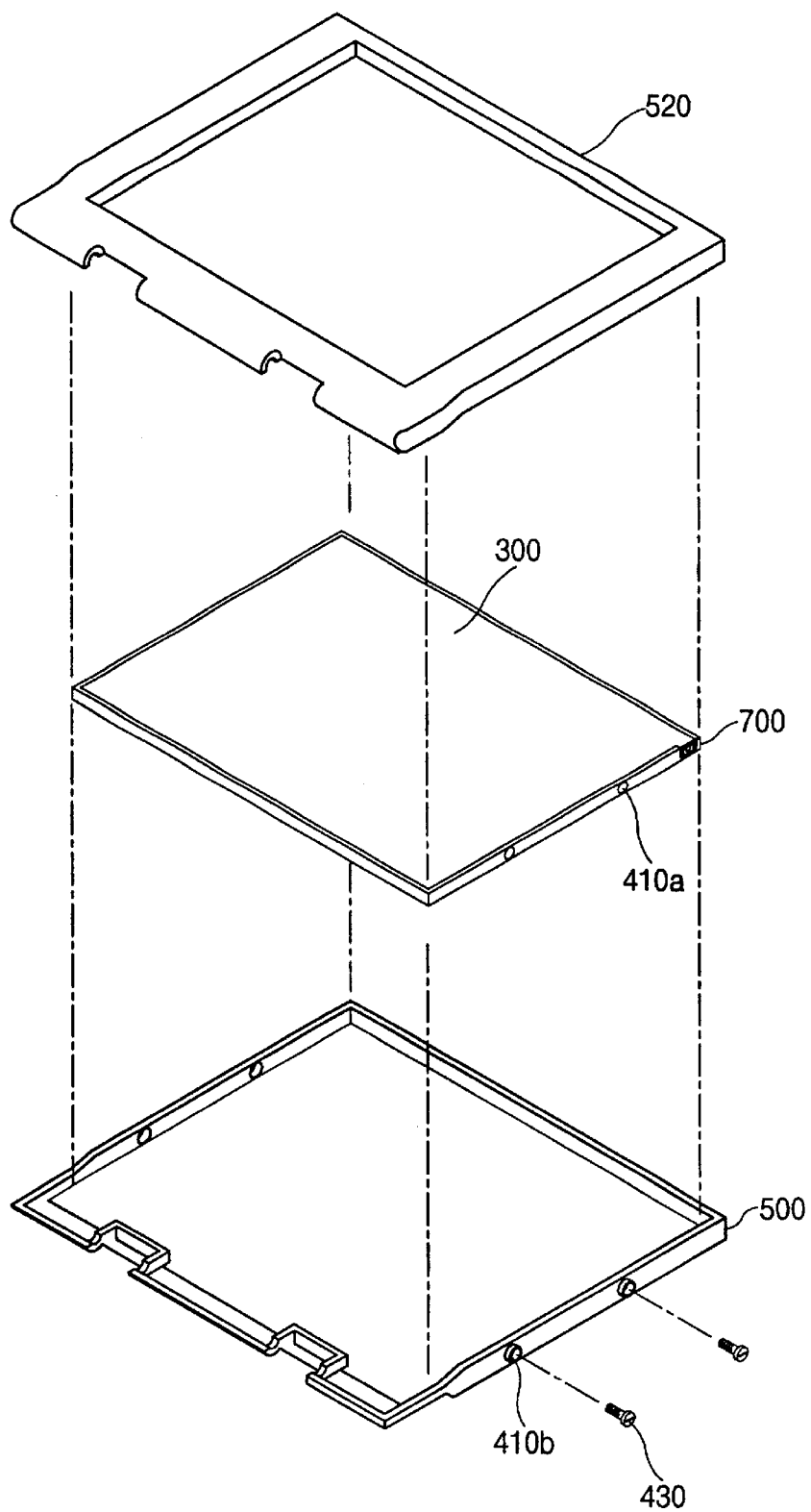
FIG. 3 is an exploded perspective view disclosed in U.S. Pat. No. 5,835,139 for showing a side mounting method.

FIG. 3 shows the mounting method disclosed in U.S. Pat. No. 5,835,139.

A first screw hole 410a is formed at a side surface of a support frame 700, and a second screw hole 410b is formed at a side surface of a back case 500. A screw 430 passes through the first and second screw holes 410a and 410b such that the LCD panel 300 is secured to the back case 500. A front case 520 is attached.

Figure 4:
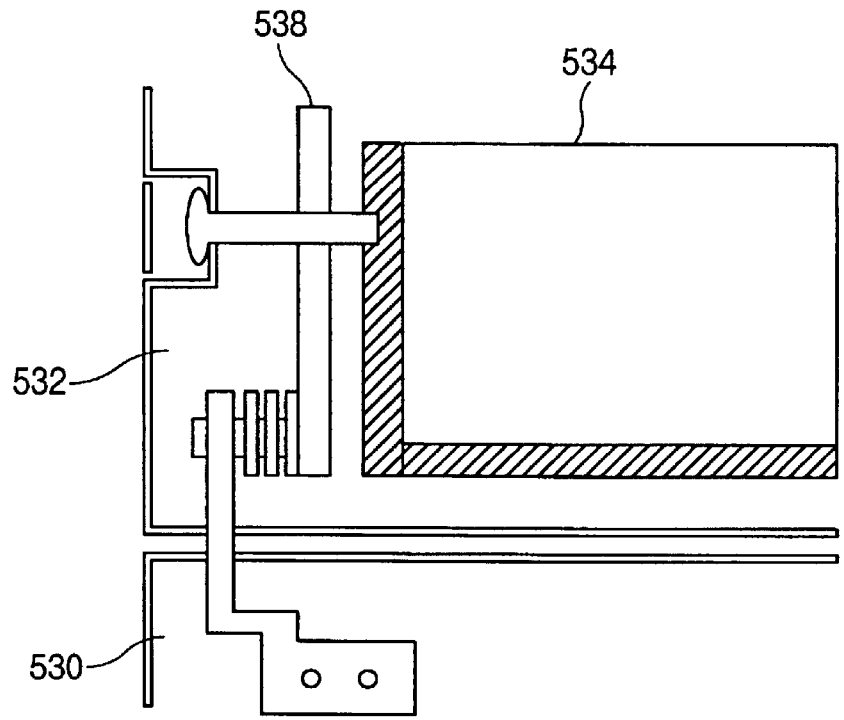
FIG. 4 is a schematic view illustrating a side mounting method using a hinge frame, disclosed in U.S. Pat. No. 5,872,606.

FIG. 4 shows the mounting method disclosed in U.S. Pat. No. 5,872,606.

A back case 532 is pivotally coupled with a case or sash 530 of a system body by a hinge mechanism 540. When a LCD module 534 is secured to the back case 532, a hinge frame 538 is interposed therebetween.

The methods described above are referred to as side mounting methods which are incorporated in this specification, and this invention aims to develop the method.

Figure 5A:
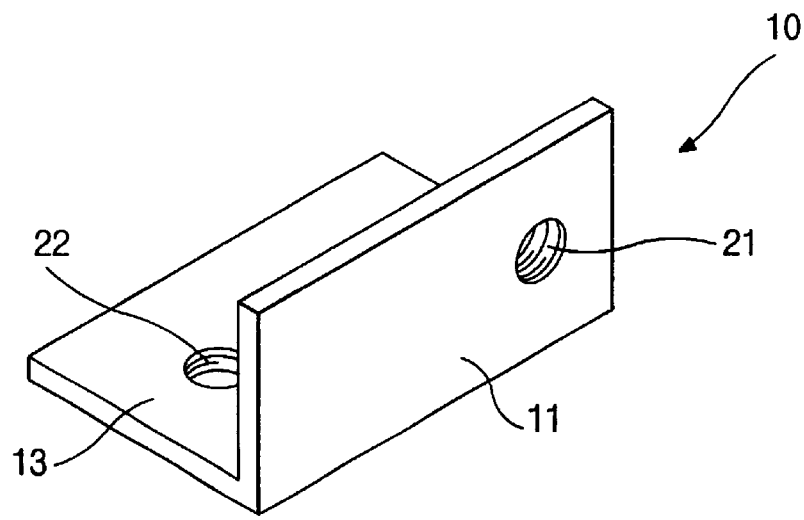
FIGS. 5A and 5B are perspective views of mounting brackets for a liquid crystal display module according to a basic embodiment of the invention.
Figure 5B:
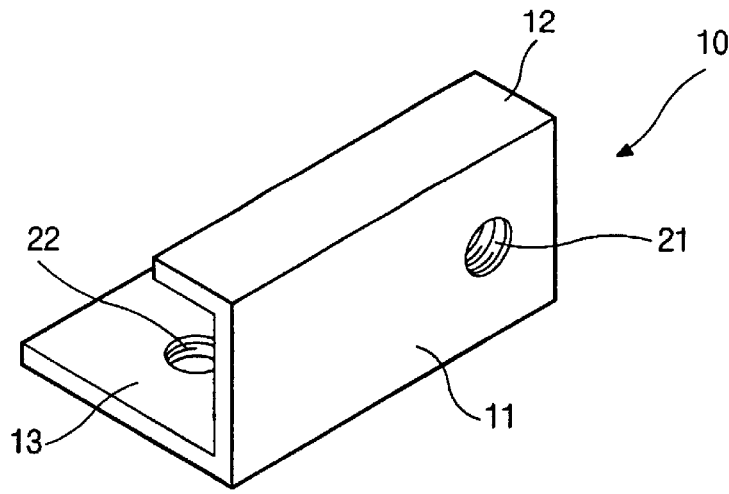

FIGS. 5A and 5B show an embodiment of the invention and a modification thereof. As shown in FIG. 5A, a bracket 10 is comprised of a main portion or lower horizontal portion 13 and vertical portion 11, and thus has an "L" shaped cross section. Further, in a preferred embodiment shown in FIG. 5B, the bracket 10 preferably includes an upper horizontal portion 12.

The lower and upper horizontal portions 13 and 12 are substantially parallel to each other and vertical to the vertical portion 11. The height of the vertical portion 11 is proportional to that of a vertical flange portion of an upper supporting frame (see 224 in FIG. 6) of a liquid crystal display module.

The vertical portion 11 and the lower horizontal portion 13 are provided with first and second screw holes 21 and 22, respectively. The first and second screw holes 21 and 22 are formed on opposing sides to be offset from each other with respect to an imaginary longitudinal line.

Figure 6:
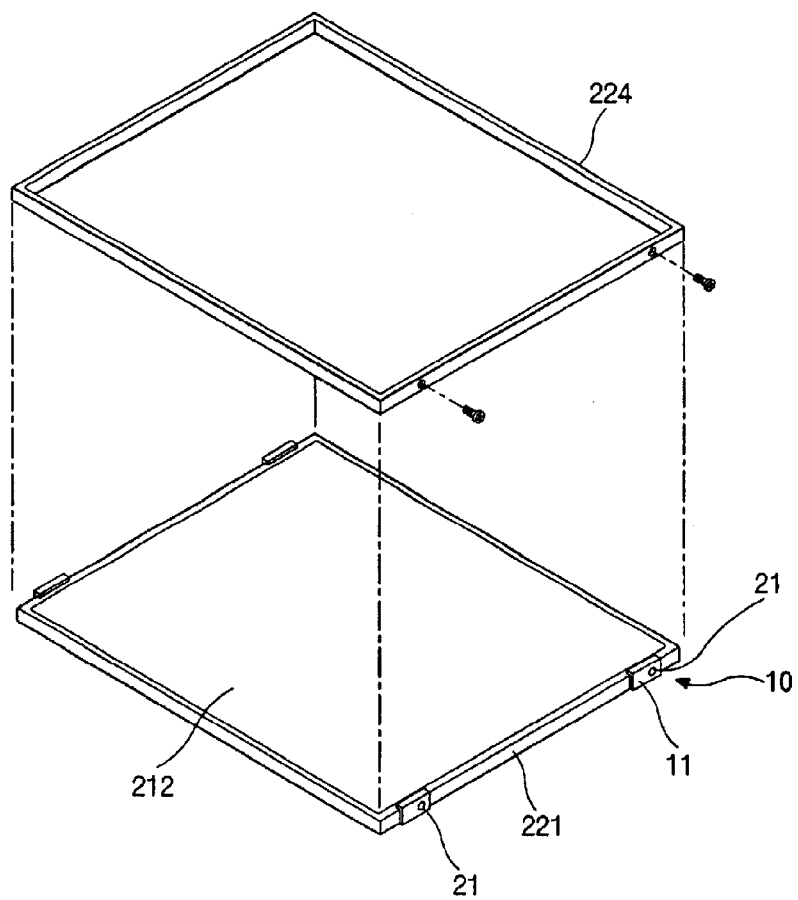
FIG. 6 is an exploded view illustrating the bracket mounted on a display module.

FIG. 6 shows an LCD panel 212 having a lower supporting frame 221 mounted with the bracket 10 of FIG. 5B before being assembled with an upper supporting frame 224. The lower supporting frame 221 is referred to as a main frame, a rear supporting frame or a main support, and the upper supporting frame 224 is referred to as a top frame, a front support frame or a metal frame.

As shown in FIG. 6, an inside surface of the vertical portion 11 of the bracket 10 contacts with a side wall surface of the lower support frame 221, and the first screw hole 21 corresponds to a hole 25 of the upper support frame 224 and an aligned hole in a supporting body (not shown) is provided for the side mounting method. The supporting body is defined as a member having a supporting surface parallel to a side wall of the module and pivotally assembled with a body of the computer via a hinge mechanism. The examples of the supporting body are a rear case and a hinge arm or hinge frame. There is no hole in any side wall of the lower support frame, and the lower support frame is only secured to the display case via the bracket 10. The second screw hole 22 of the lower horizontal portion 13 corresponds to a hole (not shown) in the lower support frame 221, to permit a screw that secures the bracket 10 to the lower support frame 221.

Figure 7:
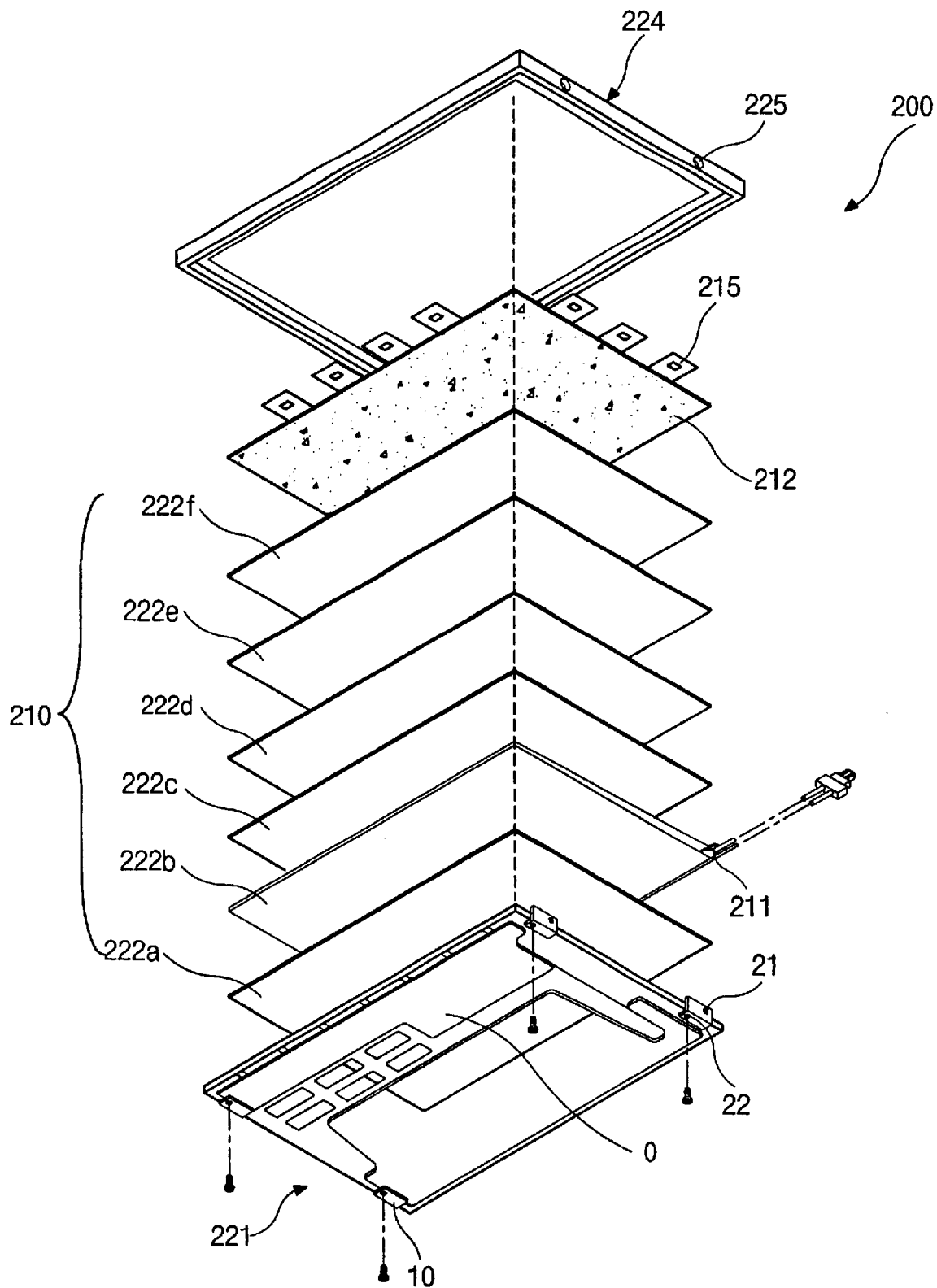
FIG. 7 is a partially exploded perspective view illustrating a display module of the invention.

Referring FIG. 7, which show a first embodiment of the present invention, a display module 200 has a display panel 212 and a back light device 210, both of which are assembled to each other by upper and lower supporting frames 224 and 221. The back light device 210 comprises a reflective plate 222f, a wave guide plate 222e, a first diffuser/protecting sheet 222d, a first prism sheet 222c, a second prism sheet 222b, and a second diffuser/protecting sheet 222a, which are stacked in above-described order.

Further, the display panel 212 is electrically connected with a PCB (not shown), a drive circuit board, through a Tape Automated Bonding (TAB) or a Tape Carrier Package 215. The drive circuit board is located on a bottom surface of the lower supporting frame 221 by bending the Tape Automated Bonding when assembled. Meanwhile, to reduce the weight of the module or to prevent the module from becoming unacceptably thick due to the PCB, an opening portion "O" is formed in the lower supporting frame at the location of the PCB.

The bracket 10 is secured to the bottom surface of the lower supporting frame 221 through a screw hole 22. The vertical portion 11 of the bracket 10 corresponds to the side wall of the lower supporting frame 221 to fasten the liquid crystal display module to the supporting surface of the supporting body (the rear case or the hinge arm or frame). The lower and upper supporting frames 221 and 224 are coupled to each other surrounding the back light device, and the screw hole 21 and the through hole 225 formed on the side wall of the upper supporting frame are aligned with each other to be passed through by a screw. The vertical portion 11 of the bracket 10 can be located adjacent to either an inner side or an outer side of the side wall of the upper supporting frame 224. It is preferred that the vertical portion 11 is interposed between the side surface of the lower supporting frame 221 and the side wall of the upper supporting frame 224 to achieve a smooth side surface of the module. When the hinge arm or frame is mounted to the module, a screw passes through a supporting hole formed on the supporting surface of the supporting body, a through hole 225 of the upper supporting frame 224, and a screw hole 21 of the vertical portion 11 in the above-described order. If the lower supporting frame 221 and the bracket 10 is firmly assembled, the through hole in the upper supporting frame 224 can have a reversed U-shaped through hole where its lower end is open such that it can be separated from and be attached to the assembly of the lower supporting frame 221 and the bracket 10.

Typically, to permit a compact LCD module, a diameter of the screw for fastening a side wall of the lower support frame and a side wall of the display case must be proportionately small. Advantageously, the bracket 10 enables the side mounting method to be applied to a compact liquid crystal display module without reducing a diameter of a screw, since the screw needs not to penetrate the side wall of the lower support frame and the side wall of the display case. And the bracket is also improved and applied to the present invention.

Figure 8:
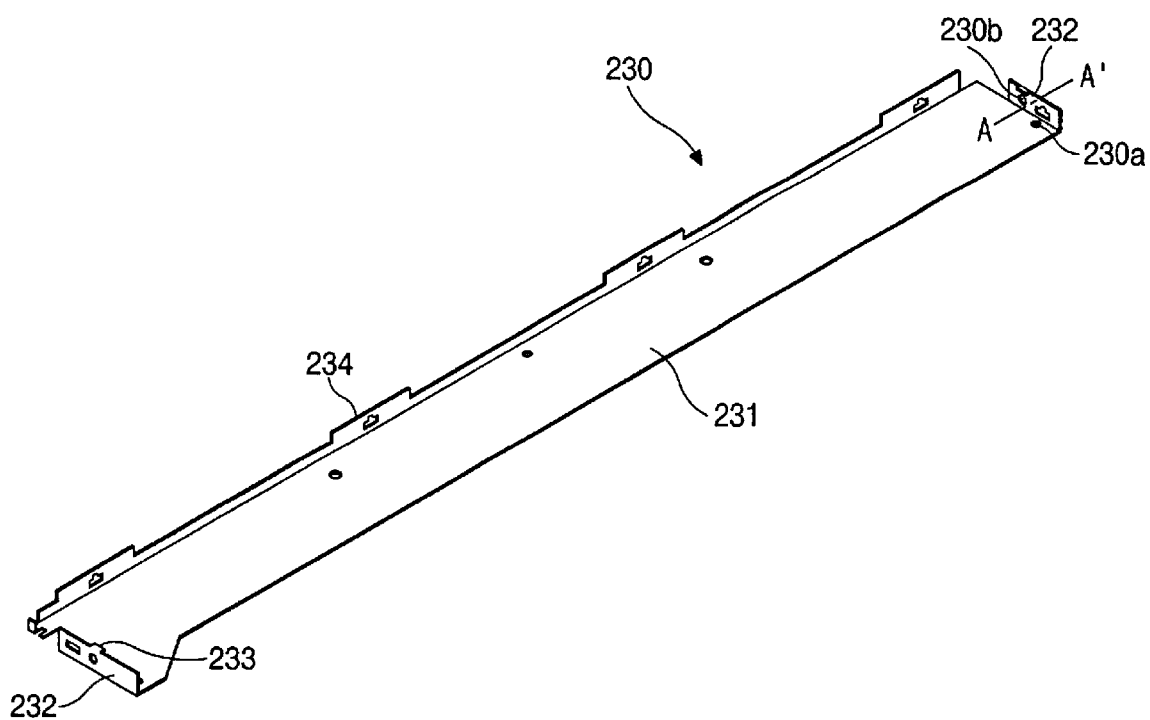
FIG. 8 is a perspective view illustrating a back cover according to another embodiment of the invention.

FIG. 8 shows a fixing unit according to a second embodiment of the present invention, and the fixing unit is a improvement of the bracket of the above embodiment so as to use the side mounting method. The fixing unit, according to the second embodiment of the present invention, has a structure in which two brackets respectively attaches to both side walls of the lower supporting frame and bottom surfaces of the two brackets extends to connect the two brackets with each other. Such a fixing unit is called a back cover.

The back cover 230 is comprised of a main portion or horizontal portion 231 and a protrusion or vertical portion 232. The horizontal portion 231 has a screw hole 230a to be coupled with the lower supporting frame 221, and the vertical portion 232 has a screw hole 230b to be joined with the upper supporting frame 224.

A cross-section, shown in this application, taken along the line A—A is based on an embodiment of the back cover 230 wherein the horizontal portion 231 and the vertical portion 232 join to form a L-shape. The vertical portion 232 has a protruded portion 233 toward the inside of the cover 230 so as to apply firm physical pressure the liquid crystal panel in order to stabilize the liquid crystal panel. Further, the cover 230 has a vertical cover portion or side wall 234 so as to protect the lamp of the back light device and a bent portion of the Tape Automated Bonding. The side wall 234 of the back cover 230 also enables easy coupling with the upper supporting frame 224.

The back cover 230 preferably extends along a longitudinal direction of a lamp or light source 211 of the back light device 210 to support the lower supporting frame 221, and further is made of stainless steel. A mounting structure of the back cover 230 and the lower supporting frame 221 is schematically shown in FIG. 9, which is shown turned upside down for a better understanding.

Figure 9:
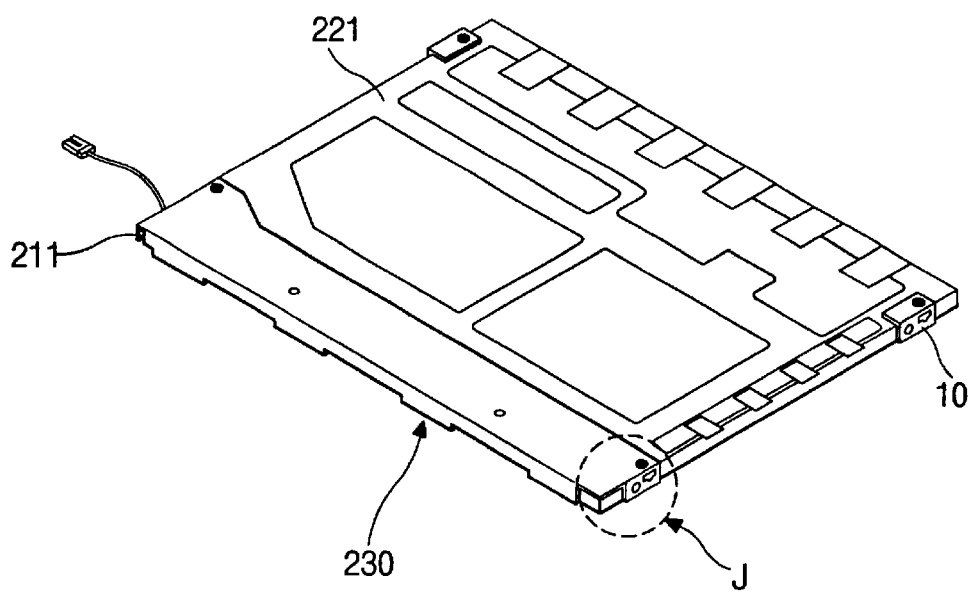
FIG. 9 is a perspective view illustrating the back cover mounted nearby a lamp, which is turned upside down.
Figure 10:
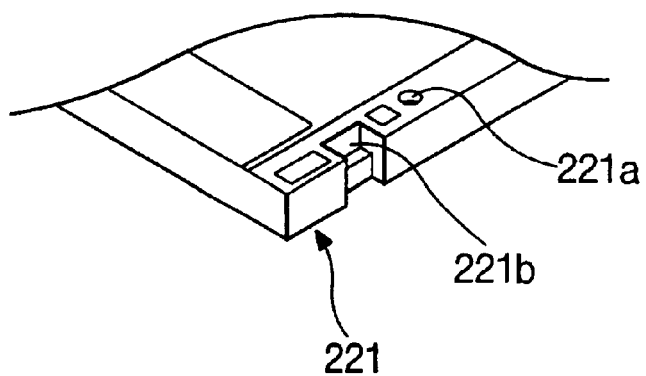
FIG. 10 is a schematic view of a "J" portion of FIG. 9, in which a back cover is removed.

As shown in FIG. 10, which the inset cutaway area "J" of FIG. 9 is also turned upside down for ease of explanation, the lower supporting frame 221 have no screw holes on the side surface thereof but rather includes a recess portion 221b on the side surface thereof, such that a screw may be tightened through the screw hole 230a. That is, the back cover 230 is screw-coupled with the lower supporting frame 221 through a screw hole 221a of the lower supporting frame 221 and a screw hole 230a of the back cover 230.

This embodiment of the present invention is designed to prevent a screw hole portion of the lower supporting frame 221 from being broken due to weakening of the lower supporting frame when the side mounting method is applied for the compact display module 200.

Meanwhile, this embodiment of this back cover 230 prevents the lower supporting frame 221 from getting bending during the assembling process or while in use. When using the side mounting method described above, both sides of the display module are fixed by a jig, and the screws are tightened in the side directions, resulting in the lower supporting frame 221 to be bent in the longitudinal direction.

Furthermore, during operation of the LCD device, the heat of the lamp may cause the same result. If the lower supporting frame is bent, a wrinkle may occur in the wave guide plate 222e of FIG. 7, which deteriorates the performance characteristics of the back light device.

Figure 11:
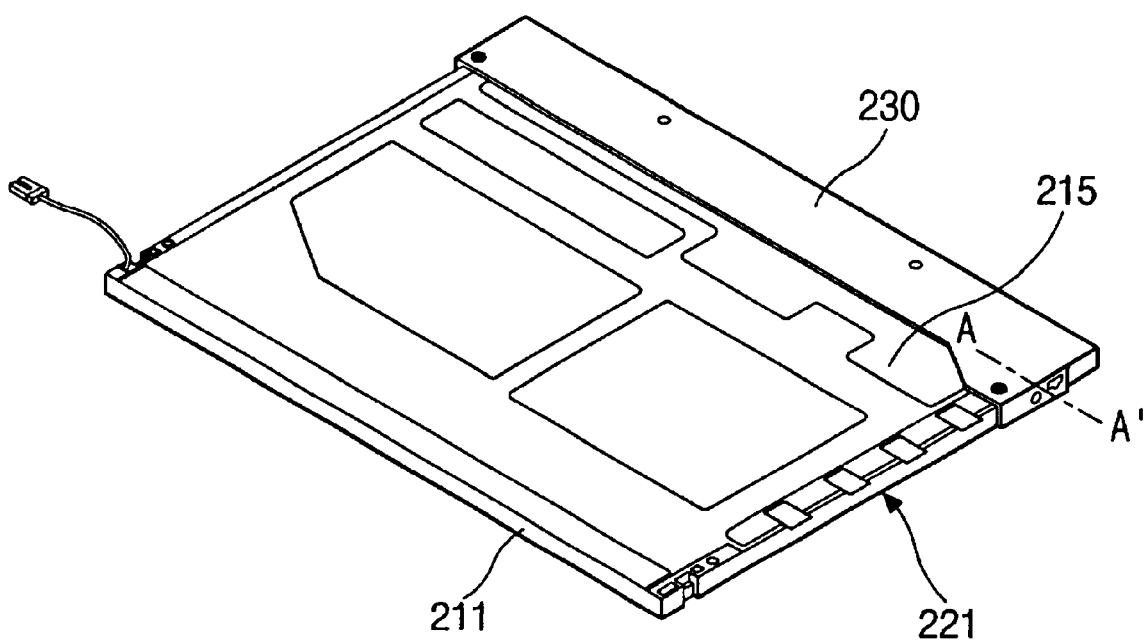
FIG. 11 is a perspective view illustrating a liquid crystal display panel mounted with the back cover on a drive circuit board.

The back cover 230 according to the invention may be located on an opposing side from the lamp, preferably on side that PCB is located, as shown in FIG. 11. This configuration depicted is also designed to support the lower supporting frame 221 leading to the effect described above. Further, two back covers can be employed as shown in FIG. 12.

In case just one cover is employed, the bracket 10 can be employed on the opposing side. in the current embodiment, the back cover 230 is preferably disposed on the lamp side because a thickness of the wave guide plate of the back light device is non-uniform and the side of the lower supporting frame which the lamp is arranged is thin in thickness and, therefore it is efficient that the back cover 230 be disposed on the lamp side to prevent a wrinkle.

Figure 12:
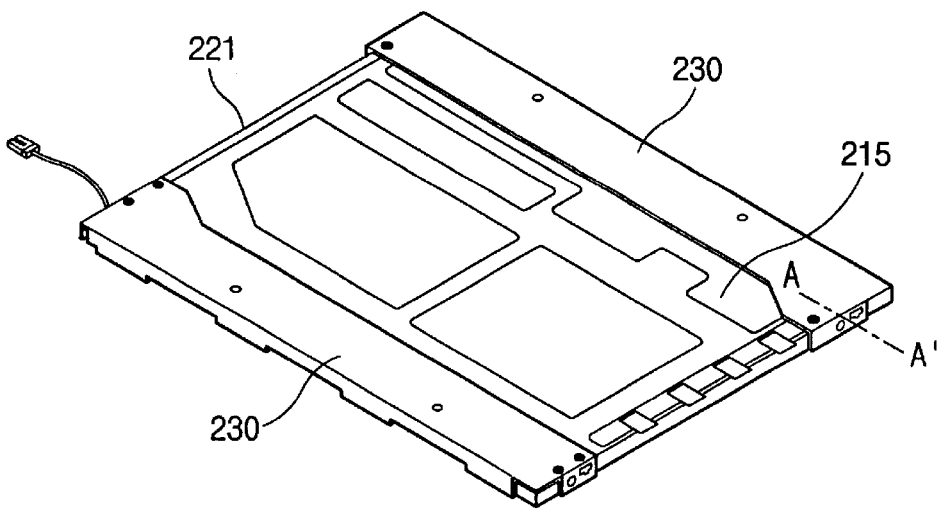
FIG. 12 is a perspective view illustrating the liquid crystal display panel mounted with two back covers.

As shown in FIG. 12, two back covers can be all arranged in the longitudinal direction of the lamp on two opposing sides. The back cover 230 has a "L" shaped cross-section based on the bracket of FIG. 5. FIG. 12 shows that the cover 230 can have a larger number of screw holes than those of FIGS. 9 and 11 for coupling with the lower supporting frame. As can be seen, the back cover can be configured in a variety of shapes.

The back cover configured as described prevents the lower supporting frame 221 from bending, and protects the PCB 215 as well as the back light device 210. Thus, the back cover 230 prevents separation of the PCB 215 from the lower supporting frame 221 and further prevents any openings or tears in the Tape Automated Bonding.

Figure 13:
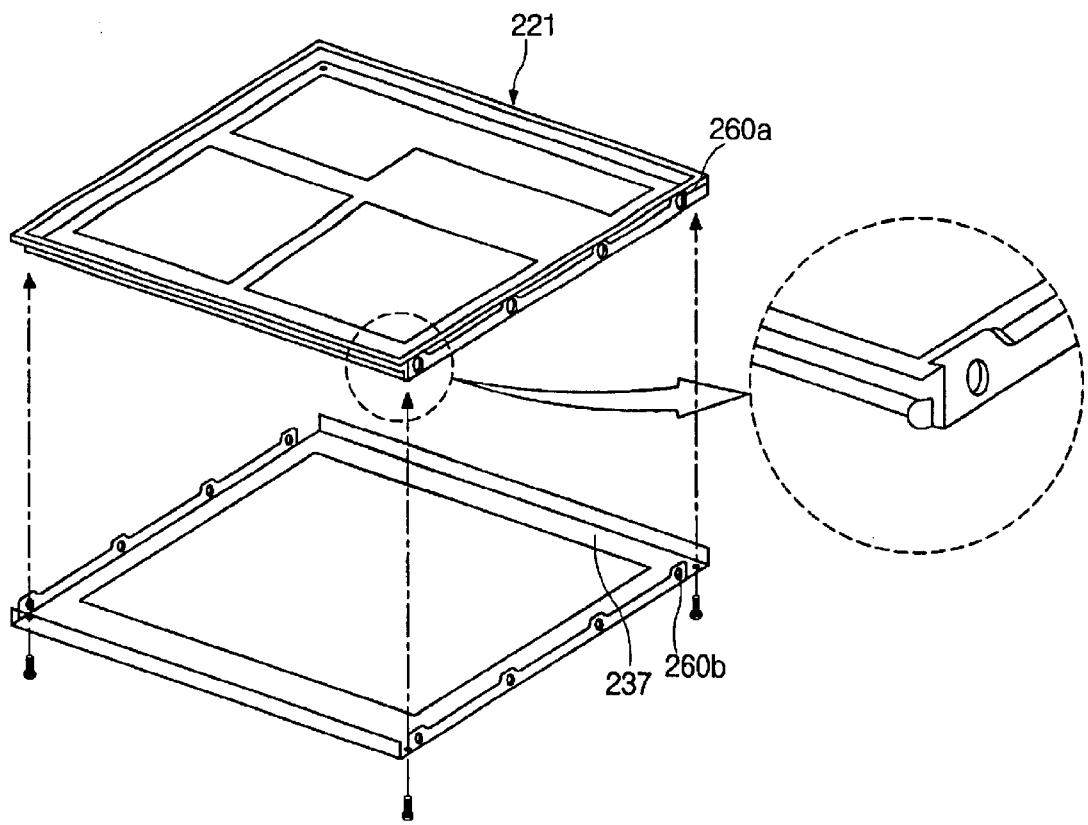
FIG. 13 is an exploded view illustrating the liquid crystal display panel mounted with a rectangular back cover.

FIG. 13 shows a modification of the back cover of FIG. 12. The two back covers 230 in FIG. 12 are separately used to support the lamp side of the lower supporting frame 221 and the opposing side respectively, but as shown in FIG. 13, the back cover 237 has four sides, joined to form a rectangular shape. The lower supporting frame 221 has a plurality of screw holes 260a, and the back cover 237 has a plurality of through holes 260b corresponding to the screw holes 260a such that the back cover 230 is attached to lower supporting frame 221 via a fastener such as a screw, nail, or rivet.

Figure 14:
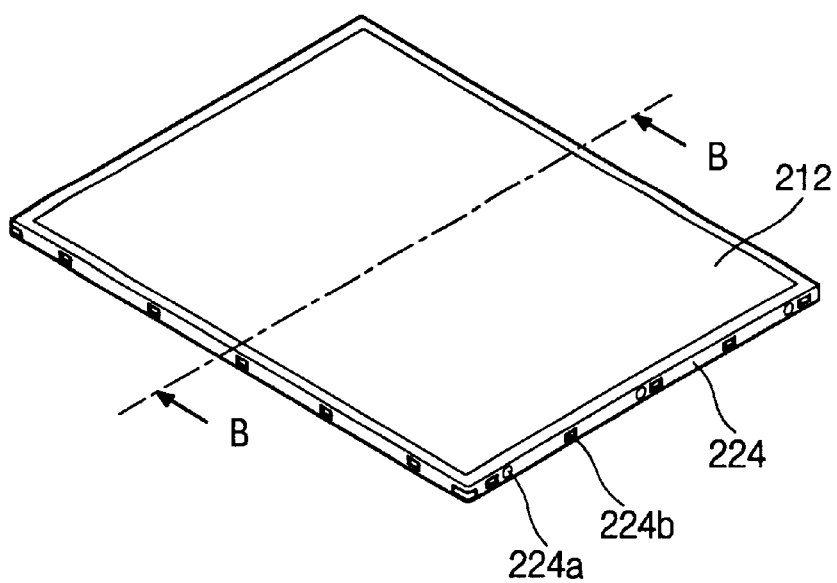
FIG. 14 is a perspective view illustrating a mounting state of an upper supporting frame and the liquid crystal display equipped with two back covers.

FIG. 14 shows what the upper supporting frame is mounted when the back cover is attached to lower supporting frame 221, for example, illustrates the mounting state of FIG. 12.

Figure 15:
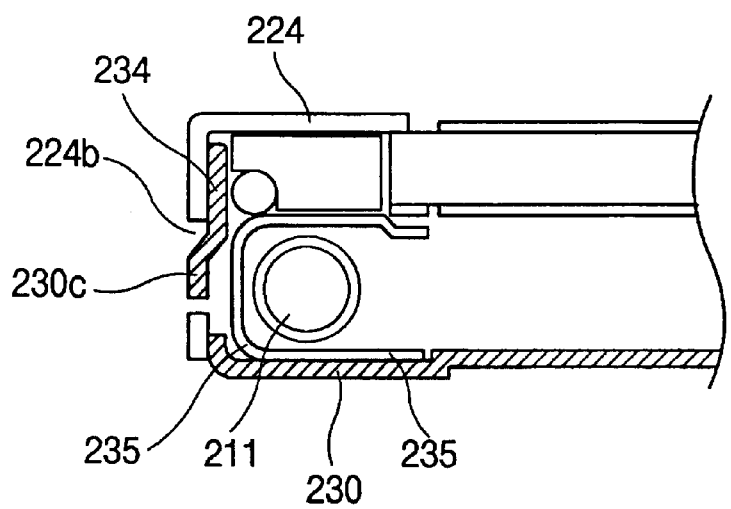
FIG. 15 is a cross sectional view of a back light portion taken along line B—B of FIG. 14.

Since the back cover 230 substantially surrounds the lower supporting frame 221, the back cover 230 is further substantially attached to the upper supporting frame 224. This will be obvious by FIG. 15, which is a cross sectional view taken along line B—B of FIG. 14.

The upper supporting frame 224 has a plurality of flexible recesses 224b, and a predetermined location of the back cover 230, preferably the side wall 234 of the cover 230 has a plurality of corresponding flexible protrusions 230c. Alternatively, the upper supporting frame can have a plurality of the protrusions, while the back cover can have a plurality of the recesses. Since the side wall 234 firmly contacts the reflective plate 235 when assembled, a movement of the reflective plate 235 is prevented. Further, since the side wall 234 of the cover 230 is reflective and the protrusion occupies a relative small area, the side wall 234 can function as the reflector. That is, if the reflective plate 235 is removed and the side wall 234 of the cover 230 is appropriately disposed, the back cover 230 can function as the support of the lower supporting frame and the reflector of the back light device at the same time.

Figure 16:
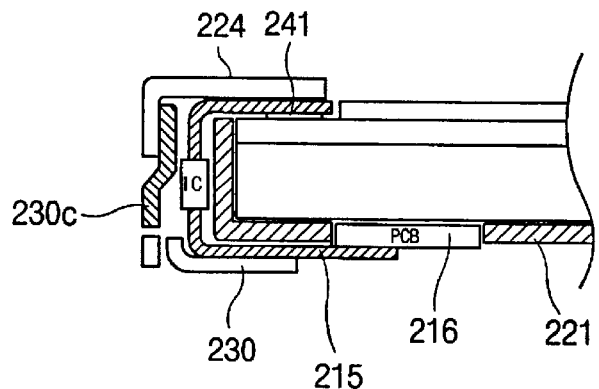
FIG. 16 is a cross sectional view of a PCB portion taken along line B—B of FIG. 14.

As shown in FIG. 16, the liquid crystal display device has two substrates. One substrate is larger in area than the other substrate to have a pad 241 for applying a signal. A driving signal from a control integrated circuit (IC) on the PCB is applied to the pad through a driving chip on the Tape Automated Bonding. The Tape Automated Bonding is bent surrounding the back light device to reduce a non-active area of the display area. At this time, the main surface of the cover 230 and the side wall of the cover 230 firmly contact pressurize the PCB and the Tape Automated Bonding, respectively and, thereby preventing internal shaking of the PCB and the TAB, leading to a low rate of failure of adhesion between the pad of the panel and the Tape Automated Bonding.

As described above, after the upper supporting frame 224 is aligned with the module mounted with the cover 230, if the upper supporting frame 224 is depressed downwardly, the protrusion 232c engages with the recess 224b and the upper supporting frame 224 is provisionally coupled to the module, and the pieces then are finally fastened to each other via a screw or other appropriate fastener. It is preferred that a location of the lower supporting frame 221 corresponding to the screw hole 230b and the through hole 224a has no separated screw hole but rather include a recess portion permitting the fastener to pass. This arrangement, similar to that described with respect to recess 221b in FIG. 10, improves the durability of the lower supporting frame 221.

Figure 17:
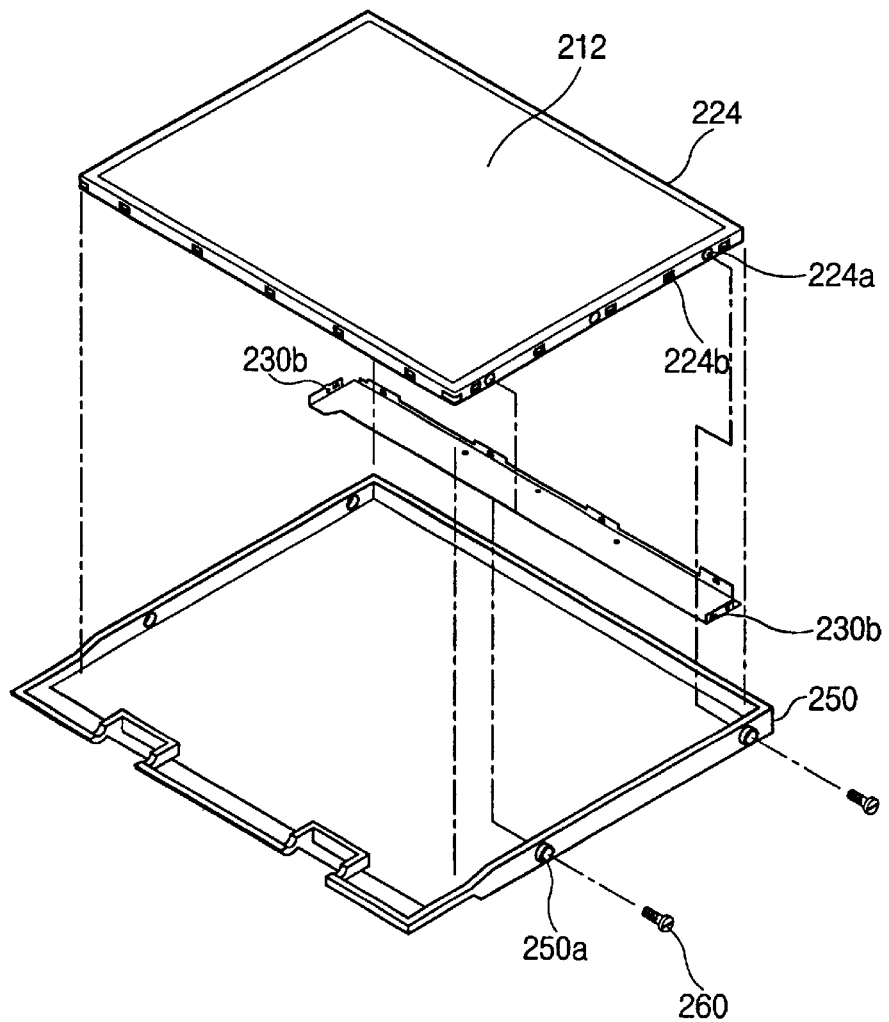
FIG. 17 is an exploded perspective view illustrating a mounting state of a liquid crystal display module and a back case.
Figure 18:
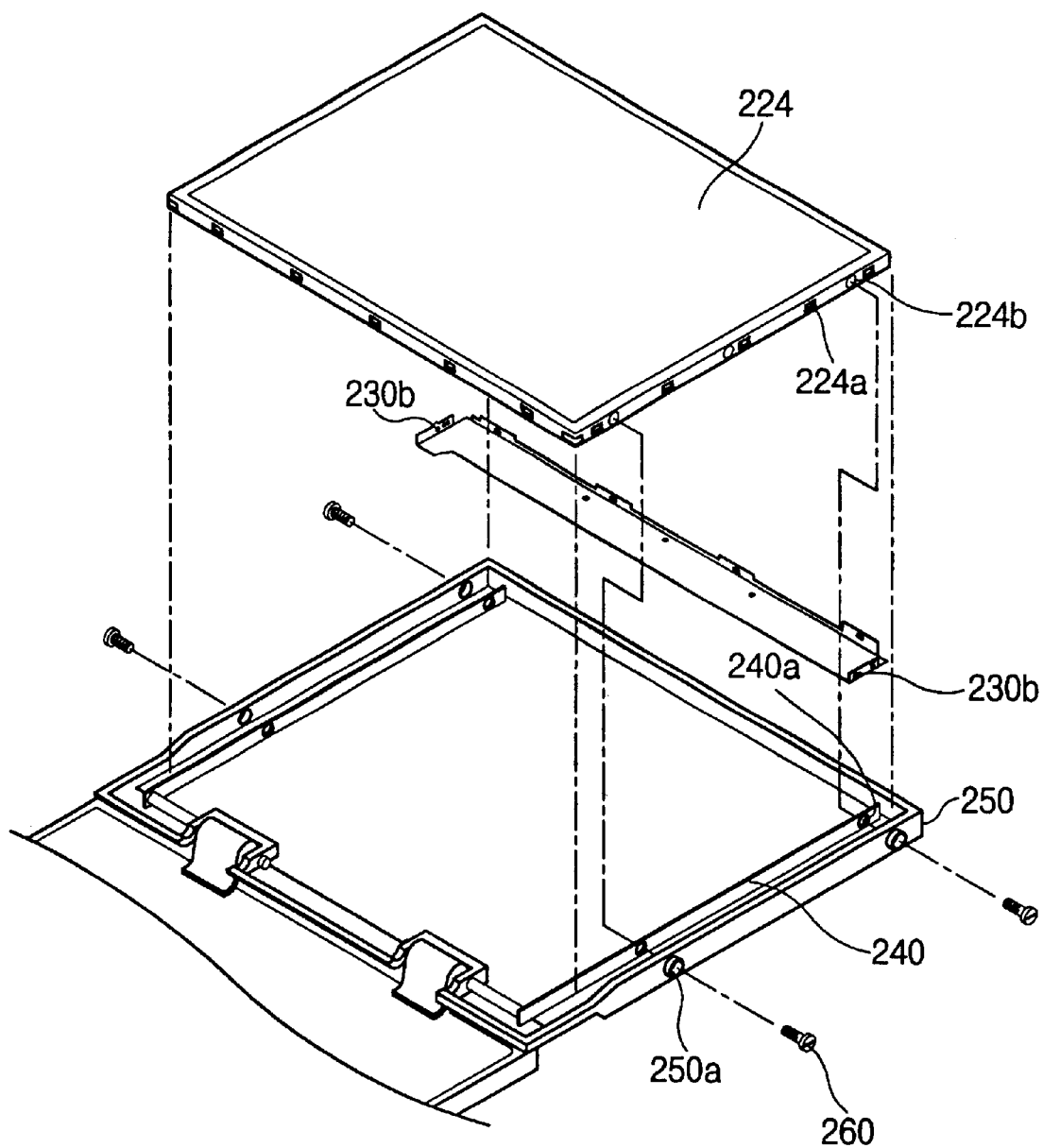
FIG. 18 is an exploded perspective view illustrating a mounting state of the liquid crystal display module equipped with the case and a hinge frame.

Of course, it is also possible that the module coupled above is fastened to a back case or a hinge frame 240, and each of which is shown in FIGS. 17 and 18.

As shown in FIG. 17, the back case 250 has a plurality of screw holes 250a corresponding to the through hole 224a and the screw hole 230a such that the back case 250, the back cover 230 and the upper supporting frame 224 are fastened to each other with a screw 260.

As shown in FIG. 18, the hinge arm 240 or a bracket coupled to the hinge also has a plurality of screw hole 240a corresponding to the through holes 224a, the screw holes 230a and the screw holes 250a such that the upper supporting frame 224, the back cover 230, the hinge arm 240 and the back case 250 are simultaneously fastened to one another with a screw 260 at the same time. Since only the hinge arm is exposed to externally applied force, the screw hole 240a and the screw hole 224a can be used for fastening without the screw hole 250a of the back case 250.

Figure 19:
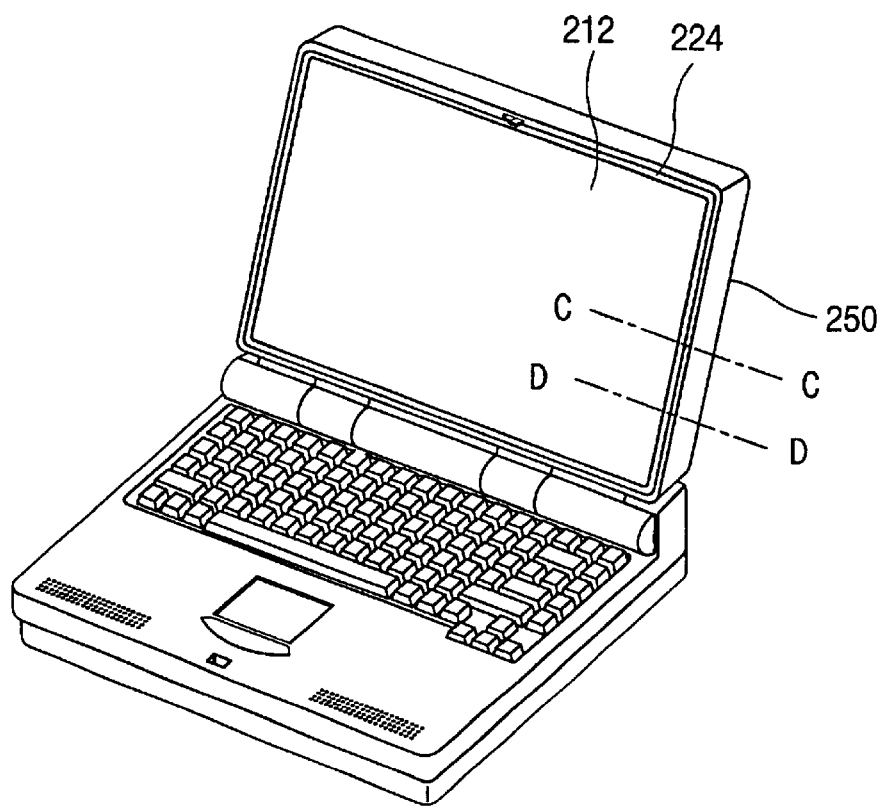
FIG. 19 is a perspective view showing a portable computer having a flat panel display device module according to the invention.
Figure 20:
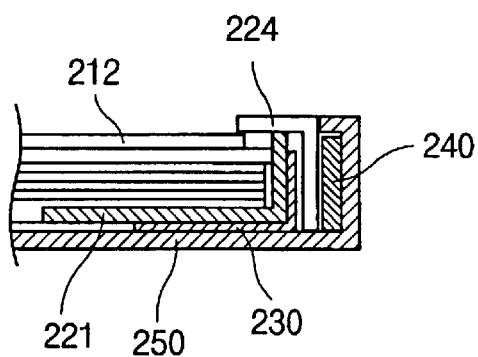
FIG. 20 is a cross sectional view taken along the line C—C of FIG. 19.

As shown in FIG. 20, the computer can have the front case and the back case, but as shown in FIG. 19, the computer has only the back case without the front case.

In such a structure, the display area can become much larger.

Figure 21:
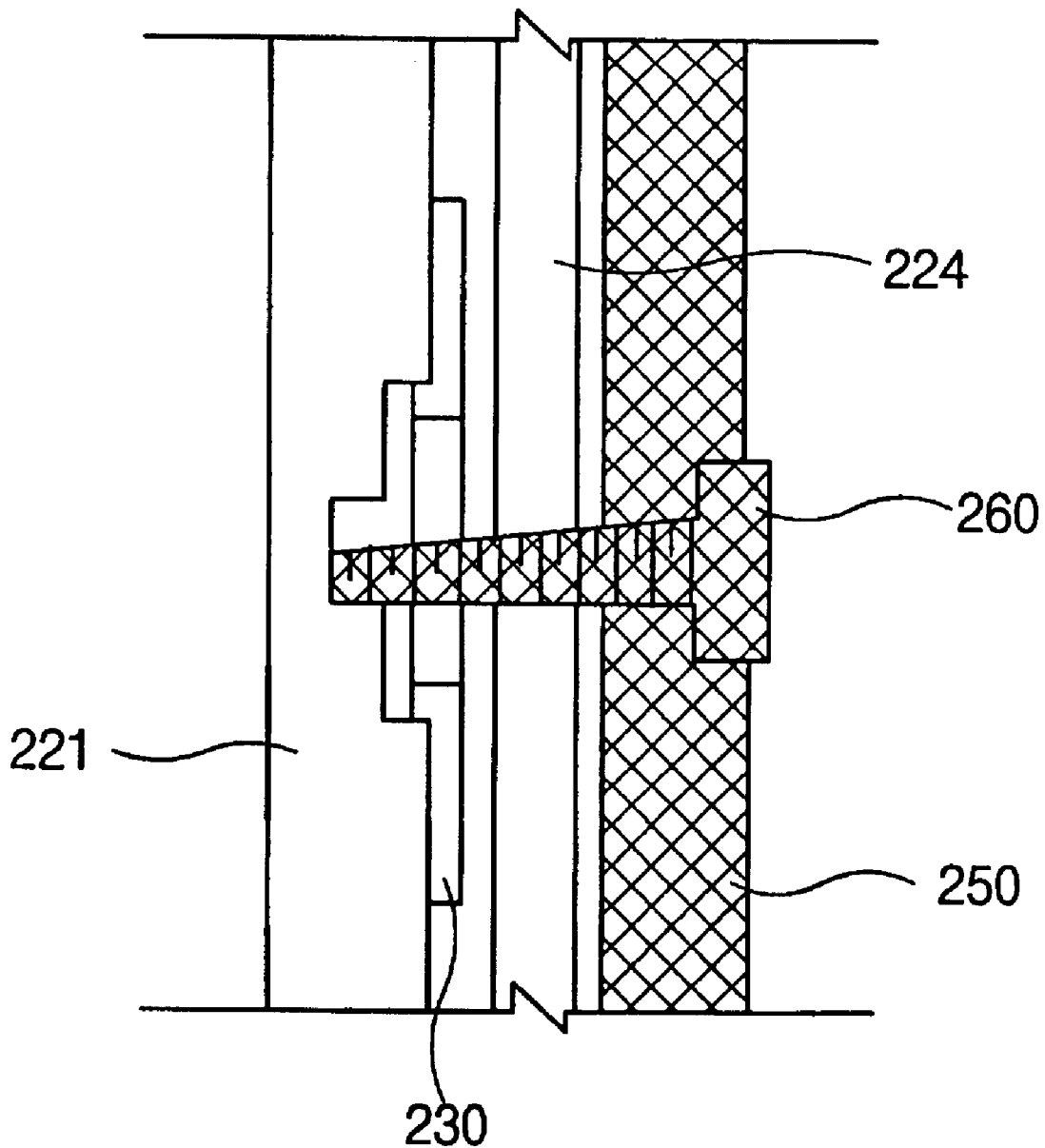
FIG. 21 is a cross sectional view taken along the ling D—D of FIG. 19.

As shown in FIG. 20, the liquid crystal display panel 212 is secured by the upper and lower supporting frames 224 and 221, the cover 230, and the hinge arm 240. Further, the upper and lower supporting frames 224 and 221, the back cover 230 and the back case 250 are fastened to each other with a screw 260 as shown in FIG. 21.

The mounting method is same as described above. Using such a mounting method, a front end of the back case 250 and the front surface of the upper supporting frame 224 are located on the same surface.

As explained herein, using the back cover according to the invention, there are described advantages that the lower supporting frame is firmly supported and the side mounting method ca be applied to a thin liquid crystal display device regardless of a thickness of the lower supporting frame.

The back cover protects the lower supporting frame from bending and prevents the PCB from being separated from the lower supporting frame 221.

It will be apparent to those skilled in the art that various modifications and variations can be made in the present invention without departing from the spirit or scope of the invention. thus, it is intended that the present invention cover the modifications and variations of this invention provided they come within the scope of the appended claims and their equivalents.

What is claimed is:

1. A flat panel display device module, comprising:

a display panel having a front surface, a side surface and a bottom surface, the front surface including a display area;

an upper supporting frame covering an edge or peripheral region of the display area of the display panel;

a lower supporting frame supporting the bottom of the display panel and contacting the bottom surface; and a fastening unit having a main portion and a bent portion vertical to the main portion, the main portion secured to the lower supporting frame, the bent portion contacting the side surface and having a screw hole;

wherein the bent portion of the fastening unit is located between the side surface of the display panel and the upper supporting frame.

2. The module of claim 1, wherein the fastening unit further comprises a second bent portion vertical to the main portion, the two bent portions of the fastening unit are opposite to each other, the main portion connecting the two bent portions.

3. The module of claim 2, further comprising, a drive circuit board, the drive circuit board being firmly contacted by the main portion of the fastening unit.

4. The module of claim 2, further comprising, a back light device having a light source disposed between the display panel and the lower supporting frame in a longitudinal direction, the main portion of the fastening unit surrounding the light source.

5. The module of claim 1, wherein the main portion of the fastening unit is screw-coupled to the lower supporting frame.

6. The module of claim 1, wherein the upper supporting frame has a side wall and a through hole corresponding to the screw hole of the bent portion of the fastening unit.

7. The module of claim 1, wherein the lower supporting frame has a recess portion corresponding to the screw hole of the bent portion of the fastening unit such that the fastening unit is attached to the lower supporting frame via a screw.

8. The module of claim 1, wherein the bent portions of the fastening unit has a plurality of outward extending flexible protrusion portion, and the upper supporting frame has a plurality of flexible recess portions corresponding to the protrusion portion of the fastening unit such that the upper supporting frame and the fastening unit are fastened to the fastening unit if the upper supporting frame is pressed downwardly by a predetermined force.

9. A portable computer comprising:

a system body;

a flat panel display device module having a front surface, a bottom surface and a plurality of side surfaces;

a supporting body being coupled to the system body via a hinge mechanism and having a supporting surface parallel to the side surface of the module; and a fastening unit having a main portion and a first bent portion vertical to the main frame, the main portion being secured to the bottom of the module and the bent portion being secured to the supporting surface of the supporting body.

10. The portable computer of claim 9, wherein the bent portion has a screw hole such that the fastening unit is attached to the supporting surface via the screw hole.

11. The portable computer of claim 10, wherein the supporting surface of the supporting body has a screw hole corresponding to the screw hole of the bent portion of the fastening unit.

12. The portable computer of claim 9, wherein the flat panel display device module is a liquid crystal display device module having a liquid crystal display panel, a lower supporting frame, and a back light device arranged between the panel and the lower supporting frame, the main portion being secured to the lower supporting frame and the bent portion being secured to a side surface of the lower supporting frame.

13. The portable computer of claim 12, wherein the lower supporting frame has a recess portion corresponding to the screw hole of the bent portion of the fastening unit such that the fastening unit is attached to the lower supporting frame via the screw.

14. The portable computer of claim 9, wherein the supporting body is a case.

15. The computer of claim 9, wherein the supporting body is a hinge arm.

16. A liquid crystal display device comprising:

a liquid crystal display panel having a front surface and a bottom surface;

a back light device arranged on the bottom surface of a liquid crystal display panel;

a first frame supporting the back light device;

a second frame located on the front surface of the liquid crystal display panel and being coupled with the first frame;

an outer case; and a fastening unit having a main portion and a first bent portion vertical to the main portion, the main portion being coupled with the first frame, the bent portion being fastened to the second frame and the outer case.

17. The liquid crystal display device of claim 16, wherein the fastening unit extends along a longitudinal direction of the first frame.

18. The liquid crystal display device of claim 17, wherein the bent portions further comprise a second bent portion vertical to the main portion, the second bent portion being parallel to the first bent portion.

19. The liquid crystal display device of claim 17, wherein the bent portions of the fastening unit connect a side portion of one of the first frame and the second frame.

20. The liquid crystal display device of claim 16, wherein the back light device has a light source arranged in a longitudinal direction, and the main portion of the fastening unit extends nearby the light source.

21. The liquid crystal display device of claim 20, further comprising a second fastening unit including a main portion parallel to the fastening unit having the main portion extending nearby the light source.

* * * * *